United States Patent [19]
Halvarsson et al.

[11] Patent Number: 6,067,238
[45] Date of Patent: May 23, 2000

[54] METHOD FOR RECONSTRUCTION OF A PLANT FOR TRANSMITTING ELECTRIC POWER AS WELL AS SUCH A PLANT

[75] Inventors: Bruno Halvarsson, Ludvika; Lars Hermansson, Västerås, both of Sweden

[73] Assignee: ABB AB, Västerås, Sweden

[21] Appl. No.: 09/230,560

[22] PCT Filed: May 27, 1998

[86] PCT No.: PCT/SE98/00996

§ 371 Date: Jan. 28, 1999

§ 102(e) Date: Jan. 28, 1999

[87] PCT Pub. No.: WO98/57410

PCT Pub. Date: Dec. 17, 1998

[30] Foreign Application Priority Data

Jun. 12, 1997 [SE] Sweden .................................. 9702249

[51] Int. Cl.$^7$ ...................................................... H02J 3/36
[52] U.S. Cl. ............................................................ 363/35
[58] Field of Search ................................... 363/35, 37, 34, 363/65; 307/87, 82, 85

[56] References Cited

U.S. PATENT DOCUMENTS 5,867,375  2/1999  Svensson et al. ........................... 363/35
5,870,293  2/1999  Svensson et al. ........................... 363/35
5,901,053  5/1999  Eriksson et al. ........................... 363/35

FOREIGN PATENT DOCUMENTS 44 39 012 A1  5/1996  Germany .

OTHER PUBLICATIONS

Uhlmann, "Power Transmission by Direct Current", Springer Verlag Berlin Heidelberg, New York, Chapter 11, Multi–Terminal Transmission Links, Dec. 1975 pp. 171–177.

*Primary Examiner*—Shawn Riley
*Attorney, Agent, or Firm*—Pollock, Vande Sande & Amernick

[57] ABSTRACT

An HVDC-plant with two stations with line commutated valves having tyristors, as rectifying semiconductor components for transmitting electric power between a direct voltage network and alternating voltage networks connected to the stations thereof is reconstructed by adding further stations thereto. In one of the two stations, the thyristors are replaced by bidirectionally controlled thyristors with ability to conduct current therethrough in both directions, and such tyristors are also arranged in the valves of each added station so as to provide an option of power feeding direction from the direct voltage network to the connected alternating voltage network of the respective station or from the respective connected alternating voltage network out to the direct voltage network in the one or each added station by controlling the current direction through the respective valve.

5 Claims, 1 Drawing Sheet

METHOD FOR RECONSTRUCTION OF A PLANT FOR TRANSMITTING ELECTRIC POWER AS WELL AS SUCH A PLANT

BACKGROUND OF THE INVENTION

The present invention relates to a method for reconstruction of a plant for transmitting electric power, which comprises a direct voltage network for High Voltage Direct Current (HVDC) and two stations connected thereto with line commutated valves with thyristors as rectifying semiconductor components for transmitting electric power between the direct voltage network and alternating voltage networks connected to the respective station thereof. The reconstruction aims at connecting further such stations to the direct voltage network while enabling feeding of electric power in an optional direction in each of the stations with the respective valve either in rectifying operation for feeding electric power from the alternating voltage network to the direct voltage network or with the valve in an inverter operation for feeding from the direct voltage network to the alternating voltage network. This invention also relates to a plant for using the present method.

The definitions above comprise not only the case, in which stations newly connected to the direct voltage network are connected to the direct voltage network already there, but these definitions are also intended to cover the case in which the direct voltage network is prolonged so as to enable connection of additional stations thereto, as would most often be the case. Also the case of a "tying together" of two direct voltage networks already existing for connection of more than two stations to the direct voltage network in such a reconstruction is intended to be covered by the definitions above.

There is sometimes interesting to reconstruct a so-called two-terminal-HVDC-line, i.e. a plant defined above with two stations for feeding electric power into the direct voltage network and draining electric power from the direct voltage network at the stations. It may then be desired to connect a third station to the direct voltage network, for example when a new such station is built on an island for taking care of the energy supply there, in which it is then desired to have a full freedom to feed power over the direct voltage network between the different stations in an arbitrary, desired direction. The thyristor and by that the valves of such two terminal plants of the type already known of this type can only conduct current in one direction, so that a changing of the direction of the transmission of power between the two stations then is made by changing the voltage polarity of the direct voltage network. However, it is not possible to add a conventional station to such a plant and obtain a full right of option with respect to the power feeding directions, since depending upon the arrangement of this valve, the current direction is then determined to always give a certain power feeding direction with respect to the power feeding direction of the other stations. Thus, is the valve thereof turned in the same direction as the valve of a certain of the stations, the power from the station added will always be fed in the same direction as in the first station. Accordingly, a much more extensive reconstruction of an existing plant with two stations is required, which will be very difficult to carry out and very costly, since a lot of existing equipment has to be changed, and new conduits and switch gears, low voltage as well as high voltage, are to be added for making possible to switch the valve and by that enable optional current direction. A considerable modification of existing control equipment in all the stations is then also required, which generates high costs. The valve halls already existing have also to be reconstructed as a consequence of the increased insulation distances required in and around the different valves, as well as the very expensive transformers are reconstructed or exchanged.

It is illustrated in FIG. 1 how such a reconstruction could take place in a plant already known, in which 1 designates a direct voltage network for High Voltage Direct Current, which here is unipolar, but it could just as well be bipolar with an earth return circuit, in which then in a known way two valves connected in antiparallel a station could be arranged and connected to a pole line each. It is shown here how three stations 2, 3, 4 are connected to the direct voltage network, in which these stations are summarised with the symbol for a valve 5, 6 and 7, respectively. Each such valve consists of line commutated thyristors, and an alternating voltage network 8 is connected to each station through a transformer 9, which for the sake of simplicity has only been shown for the station 2. By providing the stations 3 and 4 with switch gears with breakers 10–17 the power at a given voltage polarity of the direct voltage network 1 may be led to or away therefrom, depending upon the position of the breakers. The current of the direct voltage network 1 will always flow from the direct voltage network through the station 2, and when a positive voltage potential, which falls in the direction towards this station, is on the direct voltage network the valve 5 will function as inverter and transmit power from the direct voltage network to the alternating voltage network 8, while when the direct voltage network is on negative potential, which becomes more negative in the direction to the station 2, power could be fed in the opposite direction. By, for example, closing the breakers 10 and 13, but keeping the breakers 11 and 12 open, the station 3 will be in the same operation position as the station 2, in which power then will be fed to or from both thereof depending upon the polarity of the direct voltage network 1. Thus, the feeding direction will through one of the stations 3 and 4 be changed by reversing the polarities of the valve 6 and 7, respectively, so that in the case described above the breakers 11 and 12 are closed and the breakers 10 and 13 opened and, as the result, the current is led towards the direct voltage network. This solution to the problem to add further stations to a HVDC-line with two stations gets very costly as mentioned above due to a demand of supplemental control equipment and reconstruction of the valve halls as a consequence of changed insulation distances changed.

SUMMARY OF THE INVENTION

The object of the present invention is to provide a method as well as a plant of the type defined in the introduction, which enables adding of at least one further station to the plant while avoiding the enormous costs generated through the way already known to reconstruct such plants.

This object is according to the invention obtained by the fact that in such a method in one of the two stations the thyristors are replaced by bidirectionally controlled thyristors (BCT) with ability to conduct current in both directions therethrough and such thyristors are also installed as rectifying semiconductor components in the valves of each added station so as to enable a choice of power feeding direction from the direct voltage network to the respective alternating voltage network or from the respective alternating voltage network out on the direct voltage network in the one and each added station by controlling the current direction through the respective valve.

A plant with full flexibility with respect to the possibilities to drive the different stations as rectifier or inverter is obtained through this, since the operation of the valves with bidirectionally controlled thyristors may be determined by switching the current through the valves with remained polarity of the direct voltage network. Thus, by choosing a power feeding direction of the station provided with normal line commutated thyristors in the valve thereof the power feeding direction of the other stations can be determined to the same as in the one first mentioned by selecting the same current direction, to or away from the direct voltage network, as in the first or oppositely through choosing the opposite current direction. This may be made by inserting bidirectionally controlled thyristors (Bidirectionally Controlled Thyristor, BCT) in the places where "normal" line commutated thyristors have been located, i.e. those with ability to only conduct current in one direction, so that the requirement of reconstruction will be very low. It will only be necessary to modify the control equipment of such stations to a low degree, so that the two thyristor halves connected in antiparallel of the bidirectionally controlled thyristor in question, receives firing signals, through a firing channel each, in which it however would be possible to build in a unit for dividing firing signals on the respective half in the "thyristor can". The station following thereupon will be just as easy to build as a conventional station, in which the current may only be in one direction, to and away from the direct voltage network. By designing all the stations except one with a possibility to power direction change through changing the current direction through the valves in this way there will be no demand on extra insulation distances and thus reconstruction of a valve hall already there or erection of a new valve hall with unnecessarily large dimensions. The bidirectionally controlled thyristors are thyristors of the type described in, for example, DE 44 39 012 A1 and they are sometimes called two direction thyristors.

The invention also relates to a plant according to the appended independent plant claim, and the advantages of such a plant appear clearly from the discussion above of the method according to the invention.

Further advantages as well as preferred features of the invention appear from the following description and the other dependent claims.

BRIEF DESCRIPTION OF THE DRAWING

With reference to the appended drawing, below follows a description of a preferred embodiment of the invention cited as an example.

In the drawing.

DETAILED DESCRIPTION OF A PREFERRED EMBODIMENT

Figure 2:
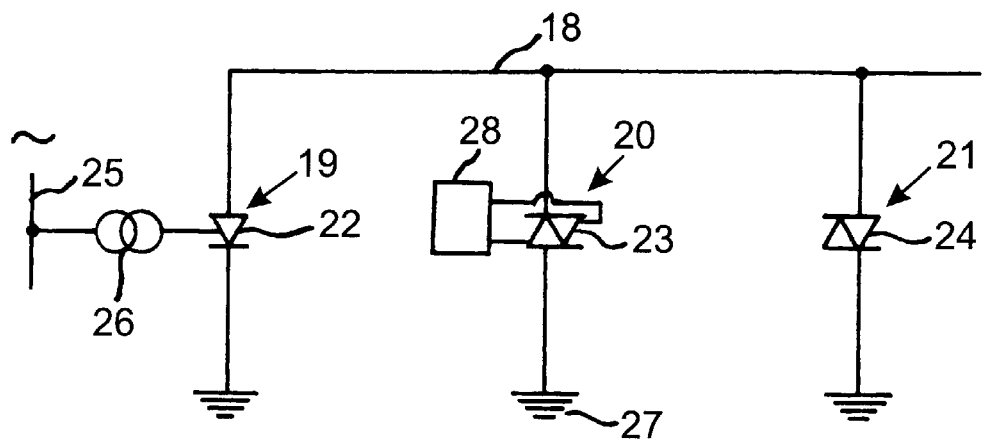
FIG. 2 illustrates in a view corresponding to FIG. 1 plant according to the present invention with the option of power feeding direction between the two stations.

The construction of a plant for transmitting electric power is very schematically and in a simplified manner illustrated in FIG. 2, the plant comprising a direct voltage network 18 for High Voltage Direct Current (HVDC=High Voltage Direct Current) and three stations 19, 20, 21 connected thereto, which are indicated through valves 22, 23, 24 and to each of which an alternating voltage network 25 only indicated for the station 19 is connected through a transformer 26. It is indicated through the continuation of the direct voltage network 18 past the station 21 that the plant may have further stations connected to the direct voltage network further away, which then are designed as the stations 20 and 21 in accordance with the description following below.

The high voltage network 18 has typically a potential difference of 10–500 kV with respect to earth 27.

The respective valve is in a conventional way formed through for example so-called 12-pulse bridges, in which a series of rectifying semiconductor components in the form of thyristors are connected in series, since each in turned-off state normally can only hold 1–5 kV and the considerably higher voltage across the valve has to be distributed among the different thyristors.

The thyristors of the valve 22 are of conventional type, i.e. they and by that also the valve can only conduct current in one direction therethrough, i.e. from the direct voltage network 18 to the station 19.

However, the valves 23 and 24 in the two other stations are constructed in a different way by replacing the thyristors by so-called BCTs (Bidirectionally Controlled Thyristor), i.e. bidirectionally controlled thyristors, which are formed by two halves of the same disc connected in antiparallel to each other, so that these thyristors belonging to the valve may through an arrangement 28 indicated for the valve 23 be controlled for selecting the current direction through the valve independently of the existing polarity of the direct voltage network for the current direction through the valve 22.

It is assumed that the station 19 and one of the stations 20 and 21 have been there from the beginning and one of the stations last mentioned which was there from the beginning then had thyristors of the same type as the station 19, but when the plant was reconstructed for connection of further stations thereto these thyristors have been replaced by BCTs.

Figure 1:
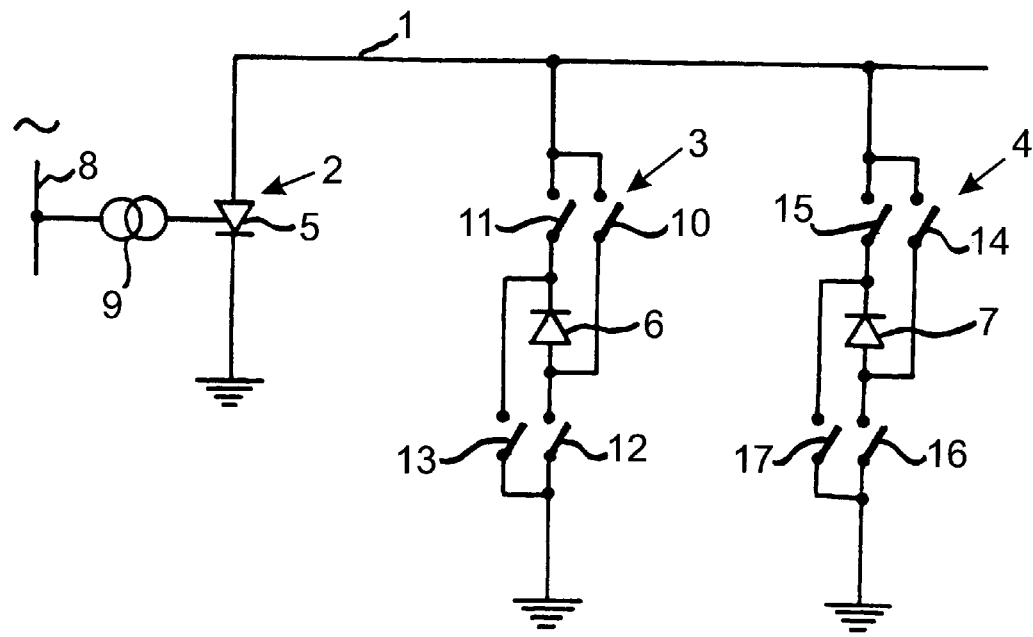
FIG. 1 is a very schematic circuit diagram illustrating the way on which a plant with more than two stations have to be reconstructed according to the prior art for flexible selection of power feeding direction between the different stations.

Through such a reconstruction, for obtain a complete flexibility with respect to the power feeding directions between the different stations, only a minor modification of the control equipment of the station already existing and rebuilt is required and no reconstruction of the valve hall thereof is needed, since the insulation distances remain unchanged. Furthermore, the requirement of additional outer switches for enabling the physical switching of the valve according to FIG. 1 will not be there any longer.

The function of the plant illustrated in FIG. 2 appears clearly to a man skilled in the art from the description above, but it is here briefly summarised.

The current at the station 19 will always be from the direct voltage network 18 towards the station 19, so that when power is to be fed from the direct voltage network to the alternating voltage network and the valve 22 accordingly has to be driven in an inverter operation the direct voltage network 18 is provided with a positive polarity, and the direct voltage network is provided with a negative polarity, the magnitude of which is larger at the station 19 than in the stations 23 and/or 24 in which the current has another direction than in the station 19 for feeding power from the station 19 and out to the direct voltage network in spite of the same current direction through the valve 22 as when feeding power in the opposite direction. The power feeding direction of the stations 20 and 21 may independently of the voltage polarity of the direct voltage network 18 and by that the function of the valve 22 as rectifier or inverter be selected by selecting the desired current direction through the respective valve 23, 24 through the control arrangement 28 thus, when selecting the same current direction through one of these valves as through the valve 22 the same power feeding direction with respect to the direct voltage network as in this is obtained and at an opposite current direction the opposite power feeding direction is obtained. Is there for example in an instant a desire to feed power from the station 21 to the stations 20 and 19, a positive polarity of the direct voltage network is then chosen with a higher potential at the station 21 than at the stations 19 and 20 as well as a current direction towards the direct voltage network of the station 21 and away from the direct voltage network of the station 20 as for the current direction of the station 19.

The invention is of course not in any way restricted to the embodiment described above, but many possibilities of modifications thereof would be apparent to a man skilled in the art without departing from the basic idea of the invention.

The number of stations or terminals of the plant could for example be more than three.

The independent method claim is intended to be interpreted so that the reconstruction to more than two stations may be started from the two stations plant, in which one of the stations is already provided with thyristors in the form of bidirectionally controlled thyristors for optional current direction therethrough, and then the stations added thereto are simply provided with such thyristors in the valves thereof, in which the very reconstruction may be considered to have been started already in the initial construction of the two station plant ready for adding further stations thereto.

It is of course well possible to arrange the station added between two existing stations.

The plant according to the invention could just as well consist of two direct voltage networks arranged in antiparallel to each other with opposite voltage polarity in the corresponding way as described above for the unipolar plant, and thus form a so-called bipolar HVDC-transmission.

We claim:

1. A method for reconstruction of a plant for transmitting electric power, which comprises a direct voltage network for High Voltage Direct Current (HVDC) and two stations connected thereto with line commutated valves having thyristors as rectifying semiconductor components for transmitting electric power between the direct voltage network and alternating voltage networks connected to the respective station thereof, the reconstruction aiming at connecting such additional stations to the direct voltage network while enabling feeding of electric power in an optional direction in each of the stations with the respective valve either in a rectifying operation for feeding electric power from the alternating voltage network to the direct voltage transmission or with the valve in an inverter operation for feeding from the direct voltage network to the alternating voltage network, said method comprising the steps of replacing in one of said two stations the thyristors with bidirectionally controlled thyristors (BCT) with ability to conduct current therethrough in both directions and installing such thyristors as rectifying semiconductor components in the valves of each added station so as to enable a choice of power feeding direction from the direct voltage network to the respective alternating voltage network or from the respective alternating voltage network out on the direct voltage network in said one and each added station by controlling the current direction through the respective valve.

2. A method according to claim 1, wherein the plant is reconstructed by adding a further station to the two original ones.

3. A plant for transmitting electric power comprising a direct voltage network for High Voltage Direct Current (HVDC) and at least three stations connected thereto with line commutated valves having thyristors as rectifying semiconductor components for transmitting electric power between the direct voltage network and alternating voltage network connected to the stations, wherein at least all said stations except for one have bidirectionally controlled thyristors (BCT) as said rectifying thyristors adapted to optionally conduct current therethrough in one desired of two directions, and wherein the stations provided with bidirectionally controlled thyristors have an arrangement adapted to control said bidirectionally controlled thyristors to optionally determine the power feeding direction from the direct voltage network to the respective alternating voltage network or from the latter out on the direct voltage network through controlling the current direction through the valve of the station.

4. A plant according to claim 3, wherein one of the stations has thyristors with ability to only conduct current in one direction therethrough as said rectifying semiconductor components.

5. A plant according to claim 3, wherein the number of stations of the plant is three.

* * * * *